United States Patent [19]

Bopp

[11] Patent Number: 4,843,116
[45] Date of Patent: Jun. 27, 1989

[54] UV LIGHT STABILIZER COMPOSITION COMPRISING CYCLIC ALIPHATIC EPOXY, UV SCREENER, AND POLYALKYLDIPIPERIDINE (HALS) COMPOUNDS

[75] Inventor: Richard C. Bopp, West Coxsackie, N.Y.

[73] Assignee: General Electric Company, Selkirk, N.Y.

[21] Appl. No.: 840,391

[22] Filed: Mar. 17, 1986

[51] Int. Cl.$^4$ .......................... C08K 5/34; C08K 5/13; C08K 5/15

[52] U.S. Cl. .................................. 524/102; 524/109; 524/114; 524/336; 524/337; 524/338; 252/401; 252/403; 252/404

[58] Field of Search ..................... 252/404, 401, 403; 524/102, 114, 109, 336, 337, 338

[56] References Cited

U.S. PATENT DOCUMENTS

| | | |
|---|---|---|
| 3,640,928 | 2/1972 | Murayama et al. |
| 4,198,334 | 4/1980 | Rasberger et al. |
| 4,288,631 | 9/1981 | Ching |
| 4,315,848 | 2/1982 | Dexter et al. |
| 4,419,472 | 12/1983 | Berner et al. ........................ 524/102 |
| 4,555,538 | 11/1985 | Shu ...................................... 524/336 |

FOREIGN PATENT DOCUMENTS 801701 9/1985 United Kingdom ................ 524/109

OTHER PUBLICATIONS

Patel, A. R. and Usilton, J. J., Ultraviolet Stabilization of Polymers: Development with Hindered-Amine Light Stabilizers, 1978, Advances in Chemistry, Series, No. 169, pp. 116–132.

Primary Examiner—Kriellion Morgan
Attorney, Agent, or Firm—Hedman, Gibson, Costigan & Hoare

[57] ABSTRACT

A cycloaliphatic epoxy compound in combination with a 2-hydroxy-substituted benzophenone compound and a polyalkyl-substituted dipiperidine compound provides a UV stabilizer that exhibits synergistic behavior. The compounds can be formulated into a composition that is coated on, or impregnated into, the surface of a plastic article or, alternatively, they can be incorporated into a thermoplastic composition which can be thereafter molded into a shaped article. The stabilizer combination succeeds in upgrading the resistance of polyphenylene ether resins and blends against the photo-deteriorative effects of sunlight and bright indoor light, for example, fluorescent lighting.

12 Claims, 2 Drawing Sheets

UV LIGHT STABILIZER COMPOSITION COMPRISING CYCLIC ALIPHATIC EPOXY, UV SCREENER, AND POLYALKYLDIPIPERIDINE (HALS) COMPOUNDS

BACKGROUND OF THE INVENTION

1. FIELD OF THE INVENTION

This invention relates to thermoplastic compositions of a polyphenylene ether resin that have been stabilized against ultraviolet light radiation by the inclusion of a combination of a hindered amine light stabilizing (HALS) compound, a hydroxy-substituted benzophenone ultraviolet light absorbing (uv screener) compound, and a cyclic aliphatic epoxy synergist.

2. DESCRIPTION OF THE PRIOR ART

The utilization of engineering plastics has been extended to a variety of products and component parts, taking the place of more conventional structural materials such as wood, metals and glass. Many such applications involve the prolonged exposure of the plastic to sunlight or bright indoor light under conditions of ordinary use. For instance, more plastics are now being used as component parts on the exterior of automobile bodies, or as housings for office business machines. Certain plastics, such as aromatic polycarbonates, exhibit good stability against the photo-deteriorative effects of such ultraviolet light radiations. Other plastics, such as polyphenylene ether resins, are inherently less stable under those conditions, and they tend to undergo chemical and physical changes which are manifested typically by changes in color. To be more specific, the surface of the plastic article tends to become more yellow or yellowish, and this is especially apparent if the object is originally colorless or pigmented with a lighter color. This yellowing, or discoloration, is undesirable, chiefly for esthetic reasons.

The art has developed various means to stabilize polyphenylene ether resin compositions, and articles made from them, against such adverse effects. In general, compounds which function as ultraviolet light (UV) stabilizers are coated on the surface of the plastic object, impregnated into the surface, or incorporated into the plastic composition itself.

U.S. Pat. No. 4,288,631 (Ching) describes derivatives of 3-alkylhydroxybenzophenones, such as 2,4-dihydroxy-3-methylbenzophenone, as superior UV stabilizers for a variety of organic thermoplastic substrates, including poly(2,6-dimethyl-1,4-phenylene oxide). Only small amounts, from about 0.1 to 1 percent by weight, need be used. The photostability of 2,4-dihydroxy-3-methylbenzophenone versus 2,4-dihydroxybenzophenone is studied in one of the examples and found to be visibly superior by showing no yellowing after over a 20-minute photolysis.

U.S. Pat. No. 3,640,928 (Murayama, et al.) discloses that many synthetic polymers can be stabilized against photo-deterioration by incorporating a small amount, 0.01 to 5.0 percent by weight, of certain piperidine derivatives. Typically, these are polyalkylpiperidine compounds, containing four methyl groups substituted on one or more piperidinyl rings.

U.S. Pat. No. 4,198,334 (Rasberger) indicates that certain substituted esters and amides derived from 4-hydroxy- and 4-amino-polyalkylpiperidines and hydroxymalonic acids are excellent stabilizers for organic polymers, especially polyolefins, but also polyphenylene oxides, protecting them against light as well as thermal oxidative degradation.

The prior art has also taught that certain combinations of compounds drawn from different chemical classes are possible for effecting UV light stabilization in polymers.

U.S. Pat. No. 4,315,848 (Dexter, et al.) reveals that the combination of a benzotriazole UV absorber with a hindered amine light stabilizer, e.g., a polyalkylpiperidine, is particularly efficacious in protecting thermoset and thermoplastic acrylic resin automotive finishes and enamels, but can also be used with a variety of organic polymers, including polyphenylene oxides.

Still other combinations are described by Patel and Usilton, in the article entitled "Ultraviolet Stabilization of Polymers: Development with Hindered-Amine Light Stabilizers", Stabilization and Degradation of Polymers, Advances in Chemistry Series, No. 169, American Chemical Society, Wash., D.C., 116–132 (1978). The authors studied the UV light stabilizing effects on polymeric substrates with bis(2,2,6,6-tetramethyl-piperidinyl-4) sebacate, as an example of a hindered amine light stabilizer, and compared it with other light stabilizers, including various benzotriazole compounds, a 4-hydroxybenzoate compound, and 2-hydroxy-4-n-octoxybenzophenone. Also tested was the effect of various pairings, including combinations of the aforementioned hindered amine with the benzotriazoles, the benzoate and the benzophenone, respectively. The experiments were directed to polyolefins, such as high density polyethylene and polypropylene, styrenic polymers, and aromatic polyesterpolyurethane. The article notes that significantly improved UV light stability occurs with bis(2,2,6,6-tetramethyl-piperidinyl-4) sebacate, and that synergistic performance of this compound with o-hydroxyphenyl benzotriazoles is apparent.

More recent developments have involved the use of combinations of certain alkoxy-substituted or alkyl ether-substituted 2-hydroxy-benzophenones with polyalkyldipiperidines as UV stabilizers in polyphenylene ether resin blends, with synergistic results being manifested. These are described in copending applications Ser. Nos. 564,420 (Peter H. C. Shu), filed Dec. 22, 1983, now U.S. Pat. No. 4,555,538 and 570,330 (Richard C. Bopp), filed Jan. 13, 1984 now abandoned, respectively, which have been assigned to the same assignee as herein.

Separately, the use of a cyclic aliphatic epoxide (Ciba-Geigy's ARALDITE CY179) in conjunction with 2,2,6,6-tetramethyl dipiperidinyl sebacate (Ciba-Geigy's TINUVIN 770, a hindered amine light stabilizer) has previously been investigated as a UV light stabilizer in blends of polyphenylene ether resin and a high impact polystyrene resin. The combination was found to provide substantial improvement in UV performance as determined by several UV tests, including window exposures, xenon arc under glass, and low intensity fluorescent exposures. In one test, this combination, in a 1:1 weight ratio, proved to be more effective by almost 50 percent than a 2:0.5 weight ratio of 2-hydroxy-4-n-octoxybenzophenone (American Cyanamid's CYASORB UV 531) and 2,2,6,6-tetramethyl dipiperidinyl sebacate (TINUVIN 770).

SUMMARY OF THE INVENTION

It is an object of the present invention to provide a new ultraviolet light stabilizer useful with thermoplastic polyphenylene ether resins and compositions.

It is a further object of the present invention to provide a thermoplastic polyphenylene ether resin molding composition which incorporates the above mentioned ultraviolet light stabilizer within it.

It is an additional object of the present invention to provide articles prepared from thermoplastic polyphenylene ether resin compositions, the surfaces of which have been made more resistant to the photodeteriorative effects of ultraviolet and other forms of light, such as bright indoor light, by the presence of the described ultraviolet light stabilizer.

In fulfillment of these objects, the discovery has now been made that the addition of just small amounts of a cyclic aliphatic epoxy compound, in combination with a UV screener such as a hydroxy-substituted benzophenone compound and a hindered amine light stabilizer such as a polyalkyl-substituted dipiperidine compound, provides a dramatic increase in the UV light stability of a polyphenylene ether resin. For instance, in one experiment a two-fold increase in the UV resistance was obtained adding only 0.5 part by weight of a cyclic aliphatic epoxy to a polyphenylene ether resin blend containing 2.0 parts by weight of 2-hydroxy-4-n-octoxybenzophenone and 0.5 parts by weight of 2,2,6,6-tetramethyl dipiperidinyl sebacate.

From this and other experiments, it has been concluded that the cyclic aliphatic epoxide is an especially strong synergist when used together with a 2-hydroxy benzophenone UV absorber and a polyalkyl-substituted dipiperidine light stabilizer, which forms the basis of the present invention.

DESCRIPTION OF THE INVENTION

Figure 1:
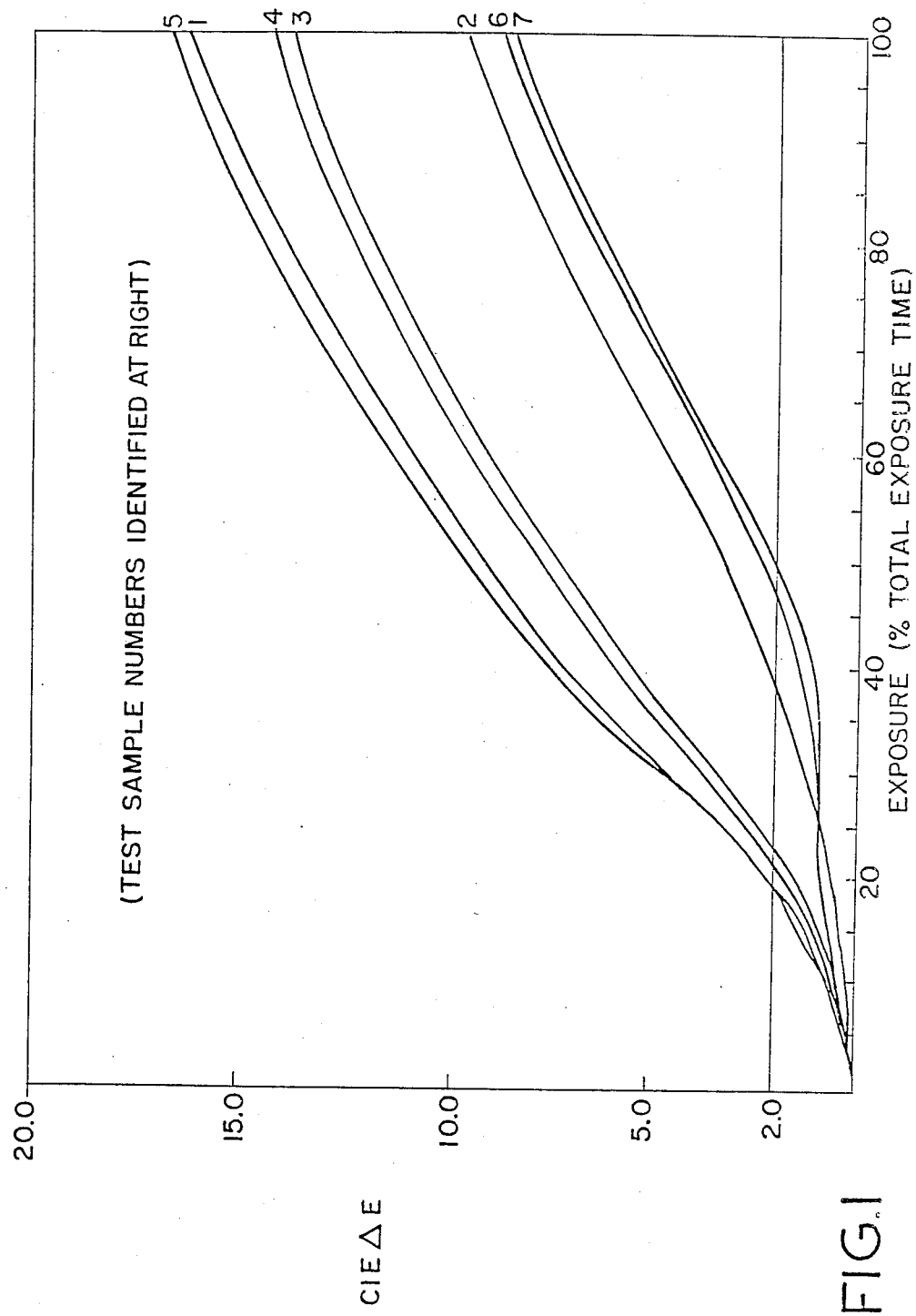
FIG. 1 is a graphic depiction of the results of accelerated HPUV tests performed on various compositions.

Briefly described, the present invention contemplates the combination of a β-hydroxy-substituted benzophenone compound (that is, 2-hydroxybenzophenone compound), a polyalkyl-substituted dipiperidine compound and a cyclic aliphatic epoxy compound as an ultraviolet light stabilizer, for use in its various possible forms. Thus, the present stabilizer, which is essentially a mixture of these compounds, can be dissolved in a solvent and impregnated into or coated on the surface of an article that has been molded or otherwise shaped from a polyphenylene ether resin composition. Alternatively, the above mentioned components of the stabilizer can be physically incorporated into a polyphenylene ether resin blend, before the latter is processed into the finished article. The individual stabilizer components are described more fully later on in this text.

Any suitable liquid organic medium can be used as a vehicle, or carrier, for the stabilizer compounds of the invention, if they are to be employed in the form of a coating or impregnation composition. Thus, for instance, the vehicle can be an organic solvent or mixture of two or more solvents in which the stabilizer compounds are dissolved. Alternatively, the vehicle can comprise a mixture of one or more solvents and one or more non-solvents for the compounds.

Suitable solvents include halogenated aliphatic hydrocarbons, such as methylene chloride, carbon tetrachloride and chloroform, and aromatic hydrocarbons, such as toluene and xylene.

Suitable non-solvents (or relatively poor solvents) include freons (fluorinated hydrocarbons) and lower alkyl alcohols such as methanol, ethanol and isopropanol.

For systems containing both solvent and nonsolvent, it is generally desired that the non-solvent be present in amounts of 50 percent by volume or more, and especially 50 to 90 percent by volume, with the balance being comprised of the solvent.

The polyphenylene ethers (also known as polyphenylene oxides) useful in the practice of the present invention are a well known class of polymers which have become well known commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a class by the presence of arylenoxy structural units. The present invention includes all such variations and modifications, including but not limited to those described hereinafter.

The polyphenylene ethers favored for use in the practice of this invention generally contain structural units of the following formula

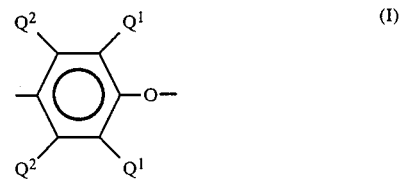

in which in each of these units independently, each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3-, or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.4 to 0.5 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether). Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (both monomeric and polymeric), o-hydroxyaryl oximes, and β-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

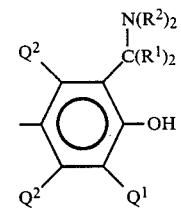

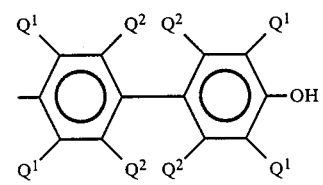

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radical adjacent to the hydroxy group on the terminal unit of the polymer chain. During further processing and/or blending, the aminoalkyl-substituted end groups may undergo various reactions, probably involving a quinone methide-type intermediate of formula IV, below ($R^1$ is defined as above), with beneficial effects often including an increase in impact strength and compatibilization with other blend components.

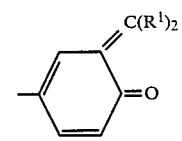

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by references. In mixtures of this type, the diphenoquinone is ultimately incorporated into the polymer in substantial amounts, chiefly as an end group.

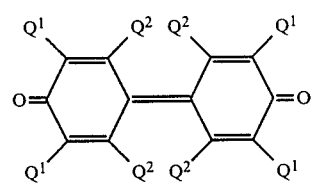

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

The polyphenylene ether resin may be used, if desired, in conjunction with an alkenyl aromatic resin, and especially a polymer derived from styrene or a homolog or analog thereof. In general, such alkenyl aromatic resins are those derived at least in part from compounds having the formula

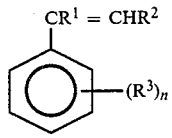

wherein $R^1$ and $R^2$ are selected from the group consisting of lower, alkyl or alkenyl groups having from 1 to 6 carbon atoms, and hydrogen; each $R^3$ is selected independently from the group consisting of chloro, bromo, and lower alkyl having from 1 to 6 carbon atoms; and n represents the total number of $R^3$ substituents, which may be the same or different, and is an integer from 1 to the total number of replaceable hydrogen atoms (5) on the ring.

Compounds within the above formula include, in addition to styrene, alpha-methyl styrene, para-methyl styrene, 2,4-dimethyl styrene, chlorostyrenes (mono-, di-, tri-, etc.), bromostyrenes (mono-, di-, tri-, etc.), para-tert-butyl styrene, para-ethyl styrene and the like.

Also included as suitable for practice with the present invention are rubber modified poly(alkenyl aromatic) resins. With reference to polystyrene resins in particular, these rubber modified resins are often referred to in the art as high impact polystyrenes, or HIPS. In general, they are prepared by adding rubber, for example, polybutadiene, during or after the polymerization of the styrene monomer. Thus, they may constitute physical admixtures of rubber and polystyrene, or interpolymers of rubber and polystyrene, or a combination of both.

Suitable rubber modifiers include, in addition to polybutadiene, polyisoprene, polychloroprene, ethylene-propylene-diene (EPDM) rubber, styrene-butadiene copolymers (SBR), ethylene-propylene rubber copolymers (EPR), polyurethanes, and polyorganosiloxane (silicone) rubbers.

The rubber content will typically range from about 5 to about 50 percent by weight, based on 100 percent by weight of the rubber modifier and alkenyl aromatic resin combined.

It is contemplated that the present invention can be used with any of the suitable materials within this general class, including the more recently developd ones where further improvements in impact strength and other properties have been attained through controlling such factors as the rubber particle size, gel content and rubber volume percent.

Thus, the terms "alkenyl aromatic resin" and "poly(alkenyl aromatic) resin" are used throughout this disclosure in their broadest sense to encompass all of the above mentioned materials.

The hydroxybenzophenones useful in the compositions of the present invention are generally those containing one or more hydroxyl groups substituted on the aromatic ring or rings, and which function as UV "screeners" to absorb ultraviolet light radiation and convert it to harmless energy. Especially advantageous are benzophenone compounds containing a hydroxy group in the ortho (2) position (also known as β-hydroxy substituted), together with an hydroxy or especially an alkoxy or alkyl ether group elsewhere on the same ring, particularly in the "4", or para, position. Typically, such compounds will be those of the formula

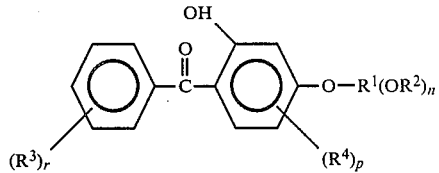

in which $R^1$ is hydrogen, or a monovalent or divalent radical of a straight or branched alkane having from 1 to 25 carbon atoms, substituted or unsubstituted with a hydroxyl group or groups; $R^2$ has the same definition as $R^1$ except it is always a monovalent radical, with $R^1$ and $R^2$ being the same or different in the same compound; $R^3$ and $R^4$ are independently hydroxy, straight or branched alkyl groups having from 1 to about 10 carbon atoms, or alkoxy groups having from 1 to about 10 carbon atoms; n is zero or 1, but is always zero when $R^1$ represents a hydrogen atom; r is zero or an integer of from 1 to 5; and p is zero or an integer of from 1 to 3.

The polyalkyldipiperidine compounds useful in the compositions of the present invention may be considered, and are generally understood to be, within the class of materials known as hindered amine light stabilizers (HALS). As employed in this disclosure, the term "polyalkyldipiperidine" refers to the presence of three or more alkyl groups present as substituents on the piperidinyl rings (hence the prefix "polyalkyl-").

Typically, in the practice of this invention such compounds will most advantageously be of the formula

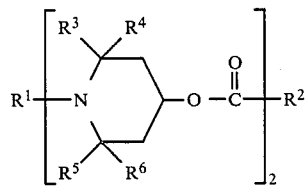

in which $R^1$ is hydrogen or alkyl having from 1 to 18 carbon atoms; $R^2$ represents a bivalent aliphatic, cycloaliphatic or aromatic radical, but especially a bivalent aliphatic radical; and $R^3$, $R^4$, $R^5$ and $R^6$ are independently alkyl having from 1 to 6 carbon atoms, preferably alkyl, especially methyl.

Particularly preferred for use in the practice of this invention are polyalkyldipiperidinyl compounds having the formula

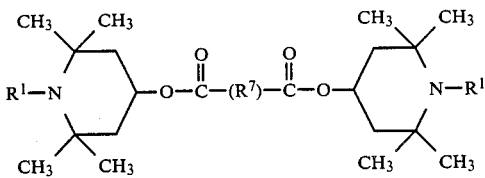

where $R^7$ is a divalent aliphatic radical having from 1 to 18 carbon atoms, and $R^1$ is as defined above.

The cyclic aliphatic epoxies, or cycloaliphatic epoxies as they may also be termed, which are useful in the stabilizer and stabilized compositions of this invention include vinylcyclohexene dioxide, 3,4-epoxy-cyclohexylmethyl-3,4-epoxy cyclohexane carboxylate, 2-(3,4-epoxycyclohexyl)-5,5-spiro(3,4-epoxy)cyclohexane-m-dioxane, bis(3,4-epoxy-6-methylcyclohexylmethyl)adipate, bis(2,3-epoxy cyclopentyl)ether, dicyclopentadiene dioxide, 1,2-epoxy-6-(2,3-epoxy propoxy)hexahydro-4,7-methanoindane, bis-3,4-epoxy-2,5-endomethylene cyclohexyl succinate, and bisepoxy dicyclopentyl succinate. These are described in "Polymerization Processes", Sheildknecht and Skeist, Wiley Interscience, Volume 29, pages 593–597(1977), which is incorporated herein by reference.

Especially preferred is 3,4-epoxycyclohexyl- methyl-3,4-epoxy cyclohexane carboxylate, having the structure.

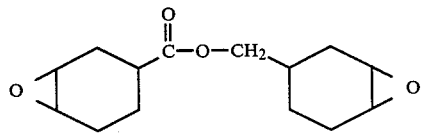

A commercial material having this structure is manufactured by Ciba-Geigy Corporation under the trade designation ARALDITE CY179.

Amounts for these components, when incorporated into a polyphenylene ether composition, may be varied considerably to accommodate individual needs, but usually the proportions will be selected to fall within certain preferred ranges which are as follows:

| polyphenylene ether resin | 10 to 90 parts by weight |
|---|---|
| Alkenyl aromatic resin | 90 to 10 parts by weight |
| TOTAL = | 100 parts by weight |
| Hydroxybenzophenone | 0.5 to 5 parts by weight |
| Polyalkyldipiperidine | 0.1 to 5 parts by weight |
| Cyclic aliphatic epoxy | 0.1 to 5 parts by weight | with the amounts of the hydroxybenzophenone, polyalkyldipiperidine and cyclic aliphatic epoxide being relative to each 100 parts by weight of the polyphenylene ether resin and alkenyl aromatic resin combined.

When the three stabilizer compounds are to be employed in a solvent, or other vehicle or carrier medium, as a coating or impregnation composition, the relative proportions of the three can be varied and the concentration will depend on the amount it is desired to deposit on or in the surface of the substrate (plastic article). Determination of such amounts is within the ordinary skill of those in the art. A preferred such composition will contain from about 1 to about 20 percent by weight of the stabilizers combined, based on 100 percent by weight of the total composition.

In practice, the compositions of this invention can also be formulated to include other ingredients, in addition to the essential components already described. These additional ingredients may be selected from among conventional additives and supplementary materials, both polymeric and non-polymeric, often employed with polyphenylene ether resins and blends to modify the chemical, physical or electrical properties.

For instance, the present compositions will often include an effective amount of one or more plasticizers, for their conventional function. In general, plasticizers serve to lower the glass transition temperature of the plastic and to soften it. Ideally, whatever material is used as the plasticizer will be heat stable, nonflammable, odorless and non-toxic, and it also will exhibit good compatibility with the thermoplastic resin. Selection of the particular plasticizer often turns out to be a compromise among these properties, however.

Among the materials suitable as plasticizers for polyphenylene ether resin, phosphates, and especially aromatic phosphates, have enjoyed considerable use. Particular mention is made of triphenyl phosphate and its derivatives, such as isopropylated triphenyl phosphate. However, depending on requirements it may be convenient or advantageous to employ other plasticizing materials, including those selected from among phthalates, esters (for example, adipate, azelate and sebacate esters), epoxides, and polymeric plasticizers such as those derived from the aforementioned esters. If the compositions are intended for use in food packaging, for instance, selection of the plasticizer will most likely be governed by FDA requirements, and plasticizers sanctioned for food-contact applications include those derived from vegetable oils, such as soybean and linseed oil epoxies, and various adipates, azelates and sebacates. Other considerations may come into play for other kinds of commercial applications, and the choice of the particular plasticizer will be guided accordingly, as those skilled in the art will understand.

The present kinds of compositions will often also contain one or more other types of additives, which are selected in general from among antioxidants, heat stabilizers, colorants (for example, dyes or pigments), fillers (for example, mineral fillers such as clay, mica or talc), reinforcing agents (for example, glass fibers, flakes or spheres, or titanate whiskers), titanium dioxide (which can function to whiten, as well as to add bulk), mold release agents, lubricants, melt viscosity reducers (to facilitate processing), flame retardant agents, synergists for enhancing the effect of flame retardant agents, and so forth.

The amounts of these various ingredients can and often do vary widely in the composition, depending on such factors as the type of additive and the desired degree of effect. Proportions will range from the minimum effective amount necessary to achieve its intended function up to, but not exceeding, the maximum level beyond which no further appreciable benefit is obtained. Typically, such amounts will range from about 0.25 to about 50 percent by weight, based on 100 percent by weight of the total composition (all of the ingredients, including additive, combined). In certain instances, amounts outside this range may be found useful or necessary. With some inert fillers, for instance, large concentrations can be used without diminishing the physical properties below tolerable levels. This may also be true of other additives. Based on the general knowledge of these substances, the most suitable proportions for a given application can be determined by the practitioner with only a small amount of work.

While the compositions of this invention are intended for use as such, it should be understood that the polyphenylene ether resin and, if also employed, the alkenyl aromatic polymer may be supplemented with one or more additional thermoplastic resins. Many thermoplastics are known to be compatible to various extents with these resins. Examples include polycarbonates, polyesters, polyamides, polyolefins, polyacrylates, polyurethanes, polyimides, polyacetals, polysulphones, and polyvinyl chlorides. Thus, the compositions can be modified to include such polymers, which may lead to further property benefits.

The described compositions can be prepared readily by physically admixing the various ingredients to form a blend, which can be accomplished in the dry state, or by solution or melt blending techniques. Preferably, for ease in storage, handling and shipping, a mixture of the ingredients is passed one or more times through an extruder, and the extrudate is cooled and cut or chopped into relatively small pellets, which can be processed subsequently at elevated temperatures into a finished article.

The compositions, once prepared, are useful for any of the commercial applications for which polyphenylene ether resin blends are known. The compositions themselves can be manufactured into various grades, such as high performance, flame retardant, general purpose, reinforced, platable, extrudable and foamable grades. Depending on the grade, they can be made into a broad spectrum of engineering plastic articles and parts for the automotive, appliance, business machine, electrical construction, liquid handling and telecommunications industries. Specific products include injection molded automotive wheelcovers, front end grilles and headlamp bezels, instrument panels, rear window shelves and speaker and defogger grilles, and lamp housings and electrical connectors; major household appliance parts, such as laundry and dishwasher consoles and lids; small household appliances, such as coffee makers, irons, food processors, curling irons, hairsetters and shower massagers, and business machine housings, just to name some.

The processing of the present compositions into these finished products can be accomplished using any of the conventional techniques, including injection or compression molding, extrusion, calendering, blow molding, blown film extrusion, and so forth. Typically, injection molding procedures are employed, with the thermoplastic composition being softened and melted in an extruder and injected under pressure into a mold where it conforms to shape. Some specific procedures, including suitable extrusion, injection (melt) and mold temperatures, are illustrated in the examples.

DESCRIPTION OF THE SPECIFIC EMBODIMENTS

This invention is further illustrated below, the description of which is intended to show preferred or best embodiments.

EXAMPLE

The synergistic boosting effect on UV stability of a cyclic aliphatic epoxy (ARALDITE CY179, Ciba-Geigy Corp.), in conjunction with 2-hydroxy-4-n-octoxybenzophenone (CYASORB UV 531, American Cyanamid Co.) and 2,2,6,6-tetramethyldipiperidinyl sebacate (TINUVIN 770, Ciba-Geigy Corp.), in accordance with this invention, was evaluated in a thermoplastic molding composition.

The composition contained 42 parts by weight of poly(2,6-dimethyl-1,4-phenylene ether) resin (PPO®, General Electric Co., intrinsic viscosity 0.46 dl./g. in chloroform at 25° C.), 58 parts by weight of a rubber modified, high impact polystyrene resin (FG 834, Foster-Grant Div. of American Hoechst Co.), 8 parts by weight of isopropylated triphenyl phosphate (Kronitex 50, FMC Corp.), 1.5 parts by weight of polyethylene, 0.5 part by weight of tridecyl phosphite, 0.15 part by weight of zinc sulfide, 0.15 part by weight of zinc oxide and 5.0 parts by weight of titanium dioxide.

Using the above formulation as a common base, the effectiveness of the stabilizer compounds on the UV stability in various combinations of one, two or three of the stabilizer compounds was measured. A control, consisting of the base formulation with none of the stabilizer compounds added, was also tested. The respective amounts of the stabilizer compounds added to the base formulation in each case are indicated in Table 1 below.

All amounts shown are in parts by weight, per hundred parts by weight of the poly(2,6-dimethyl-1,4-phenylene ether) resin and polystyrene resin combined.

TABLE 1

STABILIZER INGREDIENTS IN COMPOSITION OF TEST SAMPLES

| Test Sample | Benzophenone | Dipiperidine | Epoxy |
|---|---|---|---|
| 1[a] | 0 | 0 | 0 |
| 2[b] | 2 | 0.5 | 0 |
| 3[b] | 0 | 1 | 1 |
| 4[c] | 0 | 1 | 0 |
| 5[c] | 0 | 0 | 1 |
| 6 | 2 | 0.5 | 0.5 |
| 7 | 2 | 0.5 | 1 |

[a] control, no stabilizer compounds present
[b] comparison, two of three present
[c] comparison, one of three present Each of the compositions was prepared into a test sample under identical processing conditions by mixing the ingredients to form a preblend, extruding the preblend through a twin-screw 28 mm Werner-Pfleiderer extruder at 275° C., cooling the extrudate, cutting it into molding pellets, and injection molding the pellets into standard test pieces using a 3 oz. Newbury injection molding machine and a melt temperature of 260° C., mold temperature 55° C.

The molded test samples were evaluated for ultraviolet light resistance using two different test procedures: an accelerated HPUV test and an accelerated fluorescent light test, respectively.

The accelerated HPUV test was conducted using an Atlas HPUV Tester, following the procedure described in the operation manual.

The accelerated fluorescent light test used an ultraviolet light irradiance that was approximately 10 times more intense than a representative office exposure. Measurements were by a spectral radiometer, with the temperature of the test samples being maintained at 60° C. The exposure was continuous.

At various intervals of light exposure in accordance with each test procedure, the CIE LabΔE color change for each test sample was measured using a Gardner XL-23 Colorimeter (For reference, see "Principles of Color Technology", Billmeyer, et al.). The results are reported in Table 2 below, and graphed in FIGS. 1 and 2. A value of ΔE=2 was selected as the beginning of an objectionable color change and the material performances were judged as the relative exposure time (dose) needed to reach that value.

TABLE 2

CIE Lab ΔE
For Test Samples

| Test Sample | % Test to ΔE = 2, Accel. HPUV Test | Exposure Time (days) to ΔE = 2, Accel. Fluorescent Light Test |
|---|---|---|
| 1 | 20 | 18 |
| 2 | 39 | 36 |
| 3 | 23 | 52 |
| 4 | 22 | 26 |
| 5 | 20 | 25 |
| 6 | 48 | greater than 80 |
| 7 | 51 | greater than 80 |

Figure 2:
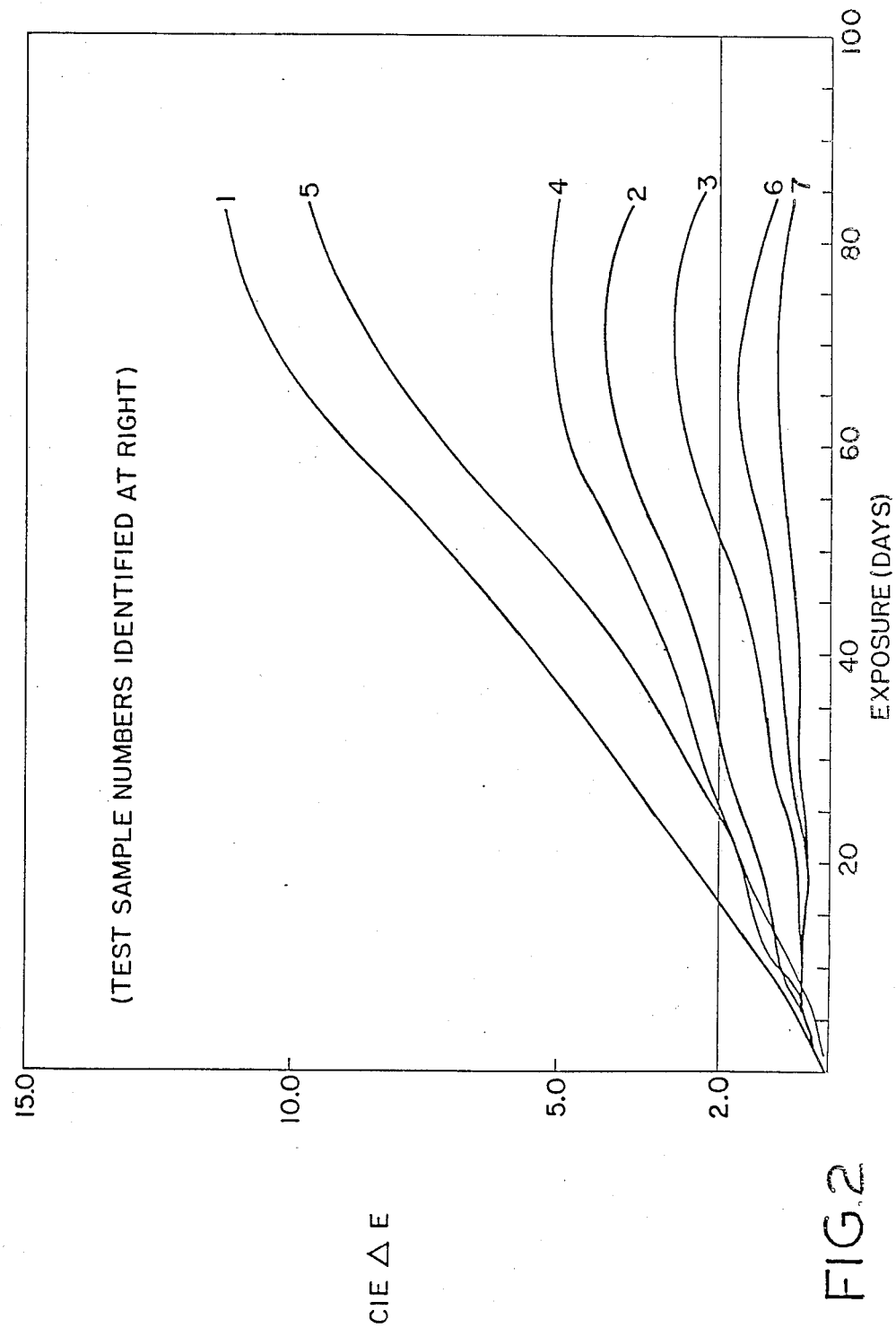
FIG. 2 is a graphic depiction of the results of accelerated florescent light tests performed on various compositions.

As can be seen from Table 2 and FIGS. 1 and 2, test samples 6 and 7, which are in accordance with the invention, exhibit the best performance for UV stability, as manifested by the greatest lengths of time to reach the equivalent ΔE color change value of 2 (in the graphs, this shows as the two lines with the smallest slopes).

FIG. 2 is considered to be the more meaningful of the two tests in that it more closely simulates real life business office conditions.

Variations of these embodiments are possible, of course, and many will be apparent in the light of the above description of the invention. For instance, in place of a polyphenylene ether homopolymer such as poly (2,6-dimethyl-1,4-phenylene ether), a copolymer such as poly(2,6-dimethyl-co-2,3,6-trimethyl-1,4-phenylene ether) can be used. Other 2-hydroxy-substituted benzophenone, tetraalkyldiperidine and cyclic aliphatic epoxy compounds can be substituted for the ones illustrated. The amounts can be adjusted to suit particular requirements. The rubber modified polystyrene resin can be replaced in whole or in part by "crystal" polystyrene (that is, non-rubber modified). These and other modifications suggested by the disclosure can be practiced without departing from the full intended scope of the invention defined in the appended claims, and without sacrificing the principles or chief benefits of the invention.

I claim:

1. An ultraviolet light stabilizer composition for a shaped plastic article, comprising a mixture of
   (a) a β-hydroxy-substituted benzophenone compound;
   (b) a polyalkyl-substituted dipiperidine compound;
   (c) a cyclic aliphatic epoxy compound; and optionally
   (d) a liquid organic vehicle (carrier) for the foregoing.

2. A stabilizer composition according to claim 1, which includes a liquid organic vehicle for components (a), (b) and (c) and said components are present in a combined concentration of from about 1 to about 20 percent by weight of the total composition.

3. A stabilizer composition according to claim 1, in which component (a) has the formula

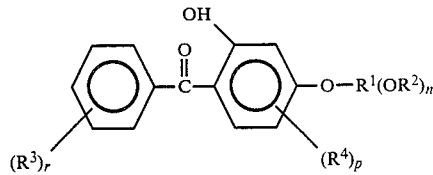

in which $R^1$ is hydrogen, or a monovalent or divalent radical of a straight or branched alkane having from 1 to 25 carbon atoms, substituted or unsubstituted with a hydroxyl group or groups; $R^2$ has the same definition as $R^1$ except it is always a monovalent radical, with $R^1$ and $R^2$ being the same or different in the same compound; $R^3$ and $R^4$ are independently hydroxy, straight or branched alkyl groups having from 1 to about 10 carbon atoms, or alkoxy groups having from 1 to about 10 carbon atoms; n is zero or 1, but is always zero when $R^1$ a hydrogen atom; r is zero or an integer from 1 to 5; and p is zero or an integer from 1 to 3.

4. A stabilizer composition according to claim 1, in which component (a) is 2-hydroxy-4-n-octoxybenzophenone.

5. A stabilizer composition according to claim 1, in which component (b) has the formula in which $R^1$ is hydrogen or alkyl having from 1 to 18 carbon atoms; $R^2$ represents a bivalent aliphatic, cycloaliphatic or aromatic radical; and $R^3, R^4, R^5$ and $R^6$ are independently alkyl having from 1 to 6 carbon 6. A stabilizer composition according to claim 1, in which component (b) has the formula in which $R^7$ is a divalent aliphatic radical having from 1 to 18 carbon atoms, and $R^1$ is hydrogen or alkyl having from 1 to 18 carbon atoms.

7. A stabilizer composition according to claim 1, in which component (b) is 2,2,6,6-tetramethyldipiperidine sebacate.

8. A stabilizer composition according to claim 1, in which component (c) has the formula 9. A stabilizer composition according to claim 1, in which component (d) comprises one or more organic solvents for (a), (b) and (c).

10. A stabilizer composition according to claim 1 adapted for use in impregnating or dip-coating fabricated articles, in which component (d) comprises one or more organic solvents selected from the group consisting of methylene chloride, chloroform, carbon tetrachloride, benzene, toluene and xylene.

11. A stabilizer composition according to claim 10 adapted for use in impregnating or dip-coating fabricated articles, in which component (d) comprises a mixture of one or more of said organic solvents with one or more nonsolvents selected from freons, methanol, ethanol and isopropanol.

12. A shaped plastic article the surface of which has ben impregnated or coated with the stabilizer composition of claim 1.

* * * * *